US 8,548,456 B1

(12) United States Patent
Ben-Eli

(10) Patent No.: US 8,548,456 B1
(45) Date of Patent: Oct. 1, 2013

(54) ADAPTIVE MOBILITY MEASUREMENT FOR CONTINUOUS PACKET CONNECTIVITY

(75) Inventor: David Ben-Eli, Modiin (IL)

(73) Assignee: Marvell International Ltd., Hamilton (BM)

(*) Notice: Subject to any disclaimer, the term of this patent is extended or adjusted under 35 U.S.C. 154(b) by 893 days.

(21) Appl. No.: 12/175,265

(22) Filed: Jul. 17, 2008

Related U.S. Application Data

(60) Provisional application No. 60/950,462, filed on Jul. 18, 2007.

(51) Int. Cl.
H04W 24/00 (2009.01)
H04W 72/00 (2009.01)
H04B 7/005 (2006.01)
H04J 1/16 (2006.01)
H04J 3/14 (2006.01)
H04L 1/00 (2006.01)
H04L 12/26 (2006.01)
G01R 31/08 (2006.01)
G06F 11/00 (2006.01)
G08C 15/00 (2006.01)

(52) U.S. Cl.
USPC ........... 455/423; 370/329; 370/311; 370/278; 370/252; 455/452.2

(58) Field of Classification Search
USPC ............ 455/436–456, 423, 161.3, 36.1, 63.1, 455/63.2, 67.11, 67.13–15, 134–135; 370/322
See application file for complete search history.

(56) References Cited

U.S. PATENT DOCUMENTS 6,249,678 B1 * 6/2001 Mathai et al. ............... 455/437
2005/0255847 A1 * 11/2005 Han et al. .................... 455/436
2008/0039094 A1 * 2/2008 Jeong et al. ................. 455/436
2008/0159183 A1 * 7/2008 Lindoff et al. .............. 370/278
2008/0225772 A1 * 9/2008 Xu ............................... 370/313
2008/0268786 A1 * 10/2008 Baker et al. .............. 455/67.11
2008/0274742 A1 * 11/2008 Bi ................................ 455/437

FOREIGN PATENT DOCUMENTS

EP          1026910 A1 *  8/2000

OTHER PUBLICATIONS

3rd Generation Partnership Project (3GPP™), 3GPP TS 25.133 V7.8.0 Technical Specification Group Radio Access Network; Requirements for Support of Radio Resource Management (FFD) (Release 7); France Jun. 2007.
3rd Generation Partnership Project (3GPP™), 3GPP TS 25.903 V7.0.0 Technical Specification Group Radio Access Network; Continuous Connectivity for Packet Data Users (Release 7); France Mar. 2007.
Nokia, *Discussion of intrafrequency measurements when CPC DRK is allowed*, R4-070639, Japan, May 7-12, 2007.
Nokia, *Introduction of continuous packet connectivity (CPC) to intrafrequency CPICH measurement requirements*, Rf-070843, Japan, May 7-11, 2007.

* cited by examiner

Primary Examiner — Kent Chang
Assistant Examiner — Nathan Brittingham

(57) ABSTRACT

The present disclosure provides a method for making mobility measurements in a cellular telephone network that includes assessing the quality of the downlink signal from an active cell during multiple discontinuous operation time periods. If the quality metric exceeds a threshold, the method calls for performing a mobility measurement on the downlink signal during a first time interval. If the quality metric is less than the threshold, the method calls for performing the mobility measurement on both the downlink signal from the identified cells and a downlink signal from a previously un-identified cell during a second time interval that is greater than the first time interval.

27 Claims, 4 Drawing Sheets

ADAPTIVE MOBILITY MEASUREMENT FOR CONTINUOUS PACKET CONNECTIVITY

INCORPORATION BY REFERENCE

This application claims the benefit of U.S. Provisional Application No. 60/950,462, "CPC Measurement Threshold" filed on Jul. 18, 2007, which is incorporated herein by reference in its entirety.

BACKGROUND

Release 7 of the third generation partnership program (3GPP) TR 25.903 V7.0.0 (2007-03) technical report defines a capability for packet data users called Continuously Packet Connected or Continuous Packet Connectivity (CPC). A mobile user equipment (UE), such as a cell phone, that has both a CPC capability and a low data rate requirement may selectively switch off some UE circuits to save battery power. For example, a UE that transfers voice over internet protocol (VoIP) data packets to and from a cellular base station (BS) or cell of a cellular network can switch on the radio frequency (RF) front end and other selected circuits, process voice data packets, then switch off the RF front end and other selected circuits.

A UE that switches receiver and transmitter circuits on and off as needed uses the discontinuous reception (DRX) and discontinuous transmission (DTX) features of CPC. The DRX and DTX features can save battery power and extend the connect or talk time of the UE. For example, a UE that receives a 2 ms data packet in a transmission time interval (TTI) every 20 ms can use the DRX feature to reduce the average power to the RF and selected circuits by 90%.

The DRX feature can interact with mobility measurements that determine which cells the UE can or might communicate with. The mobility measurements are performed by the UE and can include: 1) identifying cells, 2) measuring and reporting the identified cells to the cellular network, and 3) receiving a command from the network to add a newly identified cell to the set of active cells. Active cells are BSs that can transfer packets to or receive packets from the UE. One of the active cells may be designated as the serving cell.

Mobility measurements are reported to the network in accordance with cellular telephony standards, such as the 3GPP TS 25.133-7.8.0 technical specification. For example, section 8.1.2.2.2 ("UE CPICH measurement capability") of TS 25.133-7.8.0 specifies the rate at which cells should be measured and how fast a newly identified cell should be reported to the network. Specifically, TS 25.133-7.8.0 requires 1) identifying a newly detectable cell within 800 ms and 2) reporting eight identified cells every 200 ms. In general, the process of identifying a new cell is longer and more power-consuming than measuring an already-identified cell, whereas a mobility measurement on a previously identified cell may consume very little UE power in comparison.

One proposed modification to TR 25.903 V7.0.0 (2007-03) calls for making the mobility measurement interval proportional to the percentage of a DRX cycle that the UE receiver is active. For example, a UE that has a 10% activity factor may take 8 seconds to detect a new cell, rather than 800 ms. Such proposed modifications may reduce the mobility of a UE that uses CPC, especially for small activity factors, and may lead to a larger probability of dropped calls. For example, if the time that a UE uses to identify a new cell increases, then there is an increased probability that the cell will become obsolete or unsuitable for data packet transfer due to motion of the UE, the signal propagation condition change, and the like.

SUMMARY

The present disclosure provides a method for making mobility measurements in a cellular telephone network that includes assessing the quality of the downlink signal from an active cell during multiple discontinuous operation time periods. If the quality metric exceeds a threshold, the method calls for performing a mobility measurement on the downlink signal during a first time interval. In this case, the mobility measurement may be performed on the signals from some or all currently identified cells without attempting to identify new cells. However, if the quality metric is less than the threshold, the method calls for identifying additional cells and performing mobility measurements on both the previously identified and the additionally identified cells. The additional cell identification can be performed during a second time interval that is greater than the first time interval. As a result, the time allotted to identify additional cells can increase when signal reception quality falls below a quality metric as opposed to when the reception quality exceeds the quality metric. In the latter case, measurements may be performed for previously identified cells without searching for additional cells. In other words, a cell identification portion of a mobility measurement may be performed more often, i.e. using a larger portion of a DRX cycle, when the link quality is poor as compared to when the link quality is adequate.

The present disclosure provides for a mobile user equipment (UE) in a cellular network. The mobile UE can include a transceiver that can operate in a continuous packet connectivity (CPC) mode, receive an RF signal from an active cell of the cellular network, demodulate a data packet signal from received signal, and synchronize the mobile UE to a discontinuous reception (DRX) cycle. The mobile UE can also include a quality metric assessor that can measure the quality of the RF signal, a mobility measurement unit (MMU) that, during a mobility measurement interval, can identify and measure the quality and identify new cells as needed, and a controller that can adjust the mobility measurement interval based on the quality. The controller can adjust the mobility measurement interval, that is to say, the time between mobility measurements taken at a given measurement frequency, to increase the time allotted to perform mobility measurements when the reception quality is less than a first threshold and the MMU can identify the set of active cells during the shortest time interval. The controller can adjust the mobility measurement interval to reduce the time allotted to perform mobility measurements the when the reception quality exceeds the threshold.

The present disclosure provides for a cellular network that can include UEs operating in CPC mode. The UEs in CPC mode can include mobility measurement intervals that are adjusted according to reception quality. The parameters of the mobility measurements can be provided to the UEs by the cellular network cells through communications protocol layers.

BRIEF DESCRIPTION OF THE DRAWINGS

The disclosure will refer to the accompanying figures, wherein like numerals represent like elements, and wherein.

DETAILED DESCRIPTION OF EMBODIMENTS

Figure 1:
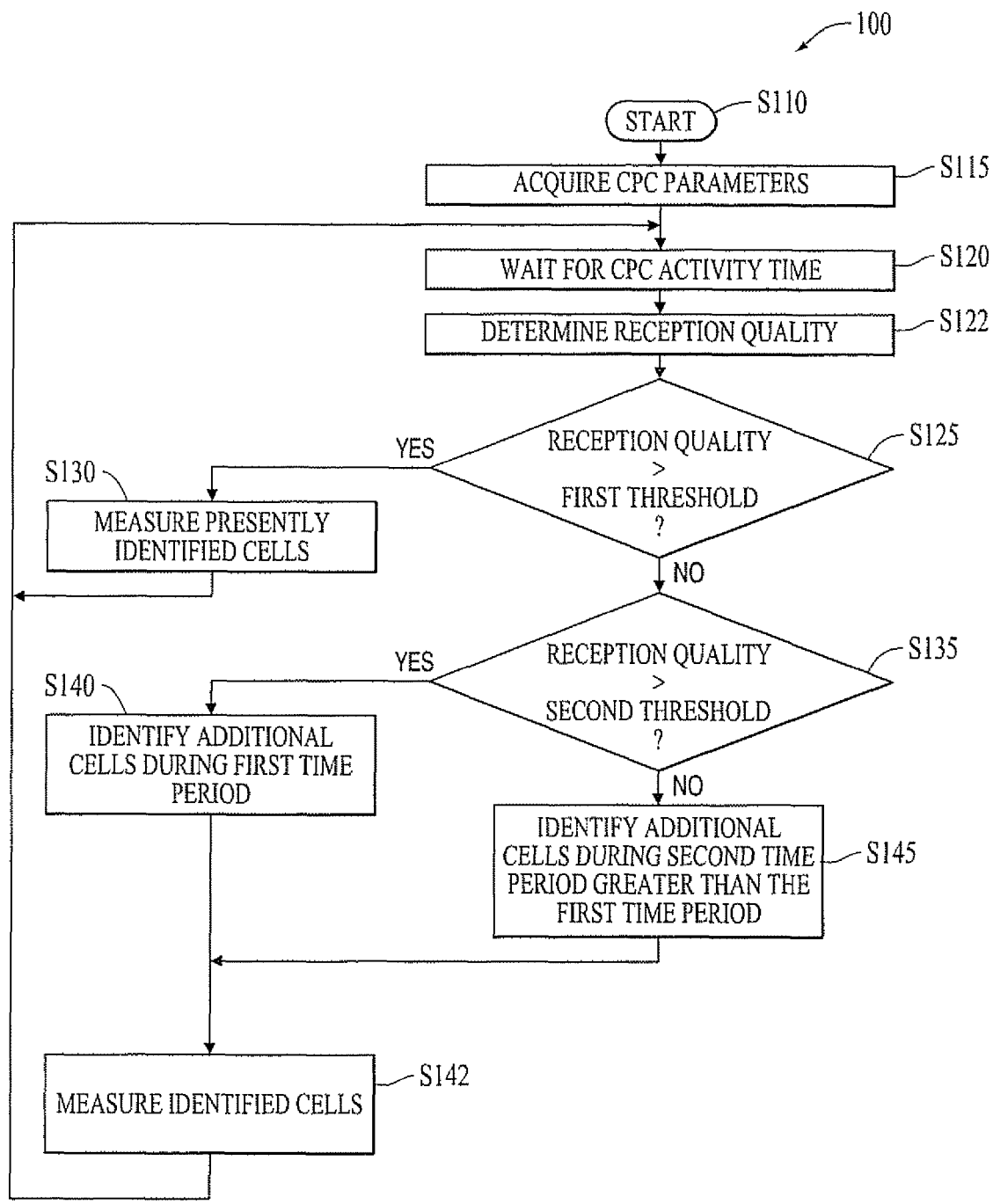
FIG. 1 shows an example program flowchart for adaptive mobility measurement.

FIG. 1 shows an example program flowchart 100 of a method for adapting mobility measurements to the downlink reception quality for mobile user equipment (UE) in continuous packet connectivity (CPC) mode in a cellular network. The program flowchart 100 may begin at program step S110 and may then proceed to program step S115 in which the UE can obtain CPC parameters. For example, the UE can receive discontinuous reception (DRX) and discontinuous transmission (DTX) cycle durations, thresholds, mobility measurement thresholds, measurement schedules, and the like. The CPC parameters can be sent from the network to the UE through communications protocol layers. The CPC parameters can be used in subsequent program steps to adjust or adapt the UE resources that detect and identify new cells. For example, the CPC parameters may determine whether a mobility measurement should occur during or after a data packet demodulation interval, set an upper or lower bound on the portion of a DRX cycle over which the UE can perform mobility measurements, and the like.

Program flow can proceed from program step S115 to program step S120 in which the UE can wait for a CPC activity time interval, such as an active portion of a DRX cycle during which the UE can receive a data packet on a downlink radio frequency (RF) signal from the BS. For example, the UE can wait for a voice packet, which may be sent once every 20 ms.

From program step S120, the program can proceed to program step S122 in which the program can determine the reception quality of the downlink RF signal from the serving cell. For example, the program can extract the reception quality of the RF signal of the serving cell based on 1) a CPICH Ec/Io level, where Ec/Io is the received energy per pseudo-noise chip for the CPICH divided by the total received energy at the UE antenna, 2) a channel quality indication (CQI), or 3) other reception quality metrics. In step S122, the program may filter the extracted reception quality to reduce the variability of the reception quality supplied to subsequent program steps. For example, program step S122 may lowpass filter, median filter, or otherwise reduce statistical dispersion in the extracted reception quality and produce a filtered reception quality.

From program step S122, program flow can proceed to program step S125 in which the UE can compare the reception quality to a first threshold. The first threshold may be downloaded from a network cell or may be set to a default value, such as by a controller element in the UE. The first threshold can correspond to a maximum reception quality or normalized quality metric. For example, the first threshold can correspond to a normalized reception quality or quality metric of 75%, as described with respect to FIG. 3. The first threshold can correspond to a "very good" reception quality of the serving cell compared with a reception quality for which the data packet from the serving cell might include an error. If the reception quality is greater than the first threshold, program flow can proceed to program step S130. Otherwise, program flow can proceed to program step S135.

In program step S130, the UE can perform mobility measurements on currently or presently identified cells only. In other words, the UE can take mobility measurements for cells that have been previously recognized as active by the UE, for example. The process of performing mobility measurements on currently or presently identified cells can consume less time and power than mobility measurements on other cells.

In an embodiment, program step S130 may use the smallest adaptive mobility measurement time to identified cells and skip the identification of new cells. For example, in step S130, the program may direct the UE to measure the mobility of identified cells for 20% of a DRX cycle. The program step S130 can save the UE power by minimizing the mobility measurement time for identified cells and not attempting to identify additional cells. From program step S130, program flow can proceed back to program step S120.

If the reception quality of the serving cell in program step S125 is not greater than the first threshold, the program flow can proceed to program step S135, in which the program can compare the reception quality with a second threshold. The second threshold can be less than the first threshold. For example, the second threshold can correspond to a normalized reception quality or quality metric of 40%, as described with respect to FIG. 3. The second threshold can correspond to an "acceptable" reception quality of the serving cell. If the reception quality exceeds the second threshold, program flow can proceed to program step S140, otherwise program flow can proceed to program step S145.

When program flow arrives at program step S140, then, during a first time period, the program can attempt to identify additional or previously un-identified cells. From program step S140, the program flow can proceed to program step S142 in which the program can measure previously identified and the additionally identified cells. It may be noted that the mobility measurement can consume little UE power and time once cells have been identified. The additional cells may be cells that have not been previously identified or cells that were not identified for a long period of time. This time period can be set by a parameter of the network or may be UE implementation dependent.

In step S140, the program can perform mobility measurements of the additional cells at a rate that is a fraction of the full mobility measurement rate or speed by allotting a lesser portion of the DRX cycle to the mobility measurement. For example, in program step S140, the program can measure mobility at 50% of full speed. From program step S140, the program can proceed to program step S142.

In program step S142, the program can measure the mobility of previously identified and additionally identified cells. For example, the program may measure all identified cells during an interval of approximately 10 ms within a 20 ms VoIP period. From program step S142, program flow can proceed back to program step S120.

When program flow arrives at program step S145, the UE can attempt to identify additional cells during a second time period greater than the first time period. For example, in an embodiment at step S145, the UE can decide not to shut off the UE reception circuitry at all, even though DRX is enabled, and perform mobility measurements continuously. From program step S145, program flow can proceed to program step S142. With respect to program step S145, it may be noted that, although the power consumption may increase when identifying new cells at full speed, the full speed mobility measurements may offer the best possible mobility during "poor" reception conditions.

The example program flowchart 100 may be understood to enable the UE to perform mobility measurements as a function of channel conditions. The channel conditions may be characterized or quantified by reception quality. The functional dependence of the adaptive mobility measurement interval on reception quality may be a discrete or step function characterized by thresholds or may be continuous function as discussed, for example, with respect to FIG. 3. With either a discrete or a continuous function, the UE may perform mobility measurements at a higher rate when conditions worsen, such as near a cell edge where reception quality drops.

Figure 2:
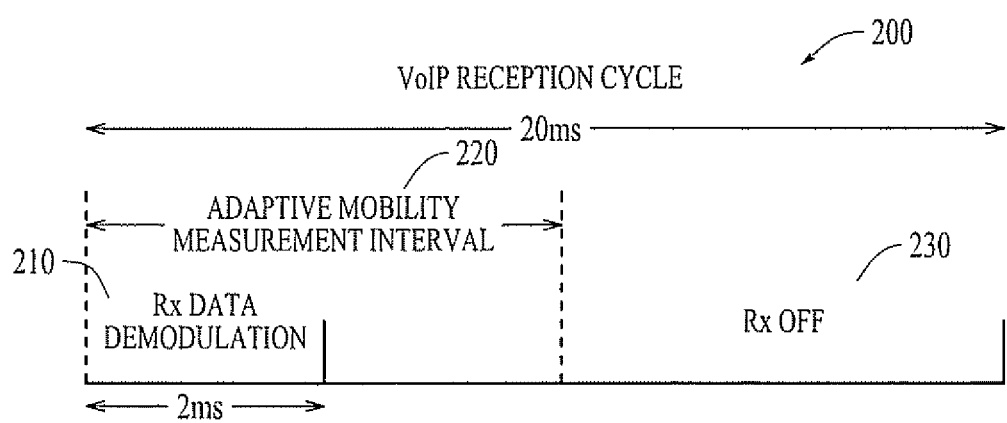
FIG. 2 shows an example reception cycle.

FIG. 2 shows an example VoIP reception cycle 200 that can include a Rx data demodulation interval 210, an adaptive mobility measurement interval 220, and a Rx OFF interval 230. In the example shown, a reception cycle 200 can be a 20 ms interval corresponding to a period of a voice over internet protocol (VoIP) packet transfer.

The Rx data demodulation interval 210 can correspond to a data packet transfer between the BS and a mobile UE. The data packet may be carried on a downlink RF signal that the UE demodulates. For example, the Rx data demodulation interval 210 can correspond to a 2 ms interval within a 20 ins VoIP period.

The adaptive mobility measurement interval 220 can include an interval during which a CPICH common pilot channel or an SCH synchronization channel is analyzed. For example, adaptive mobility measurement interval 220 can correspond to an interval during which a UE performs mobility measurements by 1) identifying cells, and 2) measuring the identified cells. The duration of the adaptive mobility measurement interval 220 relative to the reception cycle 200, can be described as a normalized activity factor, as described with respect to FIG. 3. It may be noted that the adaptive mobility measurement interval 220 can include or subsume the Rx data demodulation interval 210 since, when reception is performed, mobility measurements can be performed in parallel at the cost of very little extra UE power. The duration of the measurement interval 220 can be adaptive based on reception quality and the VoIP reception cycle 200 can be constant. The receiver may be powered off during the portion of the VoIP reception cycle 200 other than the mobility measurement interval 220, such as during the Rx OFF interval 230.

The Rx OFF interval 230 can include an interval during which the RF front end and selected circuits can be de-powered or shut off. For example, a UE that uses DRX can de-power RF preamplifiers, amplifiers, down-conversion filters, automatic gain control (AGC) circuits, analog to digital (A/D) data converters or samplers, and the like during the Rx OFF interval 230.

Figure 3:
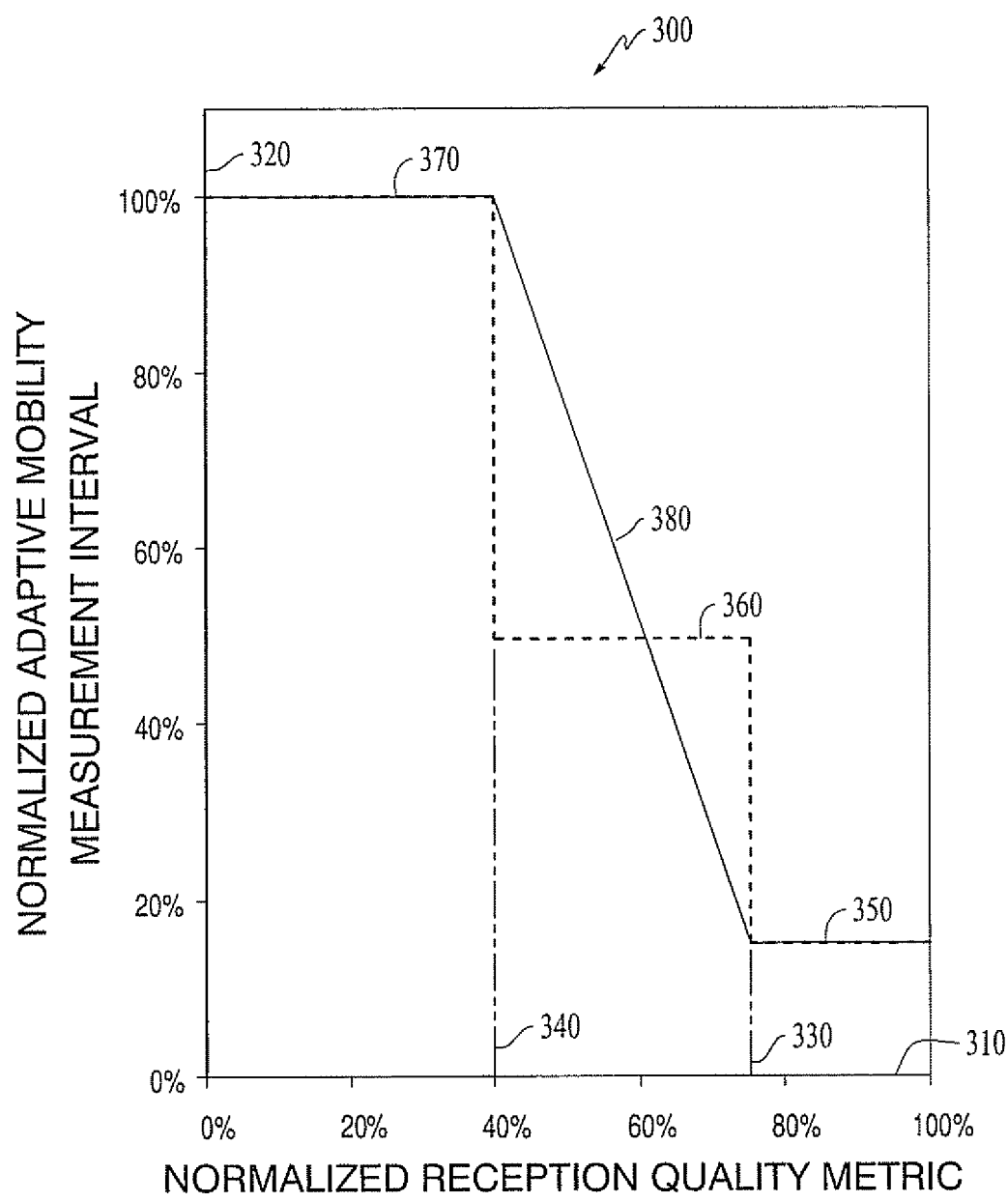
FIG. 3 shows an example functional dependence of a normalized activity factor on reception quality.

FIG. 3 shows an example functional dependence 300 of the adaptive mobility measurement interval, such as the adaptive mobility measurement interval 220 shown with respect to FIG. 2, on reception quality. The measurement interval may be described as a normalized activity factor 320. For example, the normalized activity factor 320 may equal the mobility measurement interval scaled by a DRX cycle, such as a 20 ms period for Von'.

The functional dependence 300 can include a first threshold 330, a second threshold 340, a super-threshold region 350, sub-threshold regions 360 and 370, and a relation 380. The first and second thresholds 330 and 340 may be the edges of step functions, as described with respect to FIG. 1, the vertices of piecewise linear functions, inflection points in smoothly varying functions, and the like.

The super-threshold region 350 can indicate the proportion of time a UE can take to measure previously identified cells. For example, the super-threshold region 350 can correspond to a 3 ms mobility measurement interval out of a 20 ms DRX cycle, for a normalized activity factor 320 of 15%.

In the sub-threshold region 360, the normalized activity factor 320 can increase, relative to super-threshold region 350. The sub-threshold region 360 can correspond to a step increase, relative to super-threshold region 350, in the normalized activity factor 320. The relation 380 can correspond to a linear change in the normalized activity factor 320 as a function of the normalized reception quality metric 310.

The second threshold 340 can indicate the value of a normalized reception quality metric 310 below which the normalized activity factor 320 can be at a maximum or larger than the normalized activity factor 320 in the super-threshold region 350. In other words, the mobility measurement may be performed at full speed or at an increased speed, respectively. For example, when the normalized reception quality is less than the second threshold 340, the normalized activity factor 320 may be 100%, i.e. mobility measurements can be performed continuously.

Figure 4:
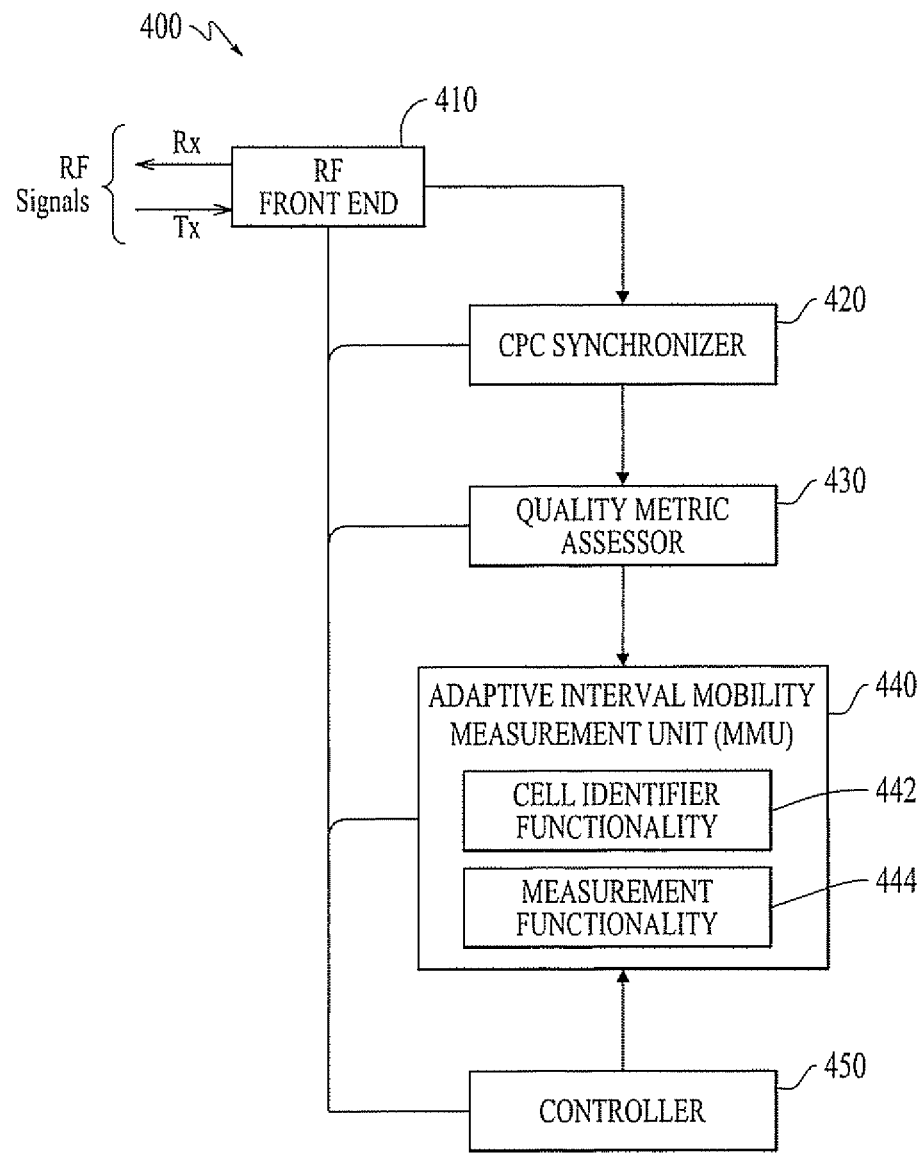
FIG. 4 shows an adaptive mobility measurement device.

FIG. 4 shows an adaptive mobility measurement device 400 that can include a radio frequency (RF) front end 410, a CPC synchronizer 420, a quality metric assessor 430, a mobility measurement unit (MMU) 440, and a controller 450. In an embodiment, the RF front end 410 and the CPC synchronizer 420 can be subsumed into a CPC capable transceiver. In an embodiment, the MMU 440 can include a cell identifier functionality 442 and a measurement functionality 444. The RF front end 410 can couple to the CPC synchronizer 420, which can couple to the quality metric assessor 430, which can couple to the mobility measurement unit 440. The controller 450 can couple a threshold to the MMU 440, and can couple command and control signals to the MMU 440, the quality metric assessor 430, the CPC synchronizer 420, and the RF front end 410.

The RF front end 410 can transmit and receive an RF signal to or from a BS. For example, the RF signals can be a wideband code division multiple access (WCDMA) signal, using a discontinuous reception cycle, DRX. The RF front end 410 can receive, downconvert, filter, demodulate the RF signal, and the like.

The RF front end 410 can send the demodulated RF signal to the CPC synchronizer 420, which can synchronize bits, bytes, blocks, and the like to standardize time intervals, such as time slots in a 3GPP standard signal structure. For example, the CPC synchronizer 420 can synchronize internal clocks, such as timers, phase-locked loops, and the like to assign demodulated and decoded data to appropriate standardized time slots. In particular, the CPC synchronizer 420 can cause the mobile UE 400 to wait for a CPC activity time or activity interval, such as a data packet transfer interval within a DRX cycle. Once synchronized to the CPC activity time, the CPC synchronizer 420 may send a synchronization flag to the quality metric assessor 430.

The quality metric assessor 430 may extract a reception quality metric from the demodulated RF signal. For example, the quality metric assessor 430 may process a portion of the demodulated RF signal to examine a continuous CPICH common pilot channel signal and extract a reception quality metric, such as Ec/Io. The quality metric assessor 430 may, in addition to or instead of using the CPICH, assess a signal quality based on a signal-to-noise ratio (SNR), a signal-to-interference ratio (SIR), a statistical analysis of the demodulated and decoded data packet, and the like. For example, the quality metric assessor 430 can examine statistical moments of the downconverted signal, analyze the mean and variance of the downconverted signal, determine coherence and correlation functions of the data, and the like. The quality metric assessor 430 may select an individual quality metric or may combine multiple quality metrics, such as a CPICH Ec/Io metric and SIR. The quality metric assessor 430 may transfer the reception quality metric to the MMU 440.

The MMU 440 can include a cell identification functionality 442 and a measurement functionality 444 and can determine an adaptive mobility measurement interval based on a predetermined functional dependence on reception quality. For example, the MMU 440 may use a first and a second threshold as described with respect to FIG. 1 or a discrete or continuous functional dependence as shown with respect to FIG. 3. In the example of a discrete functional dependence, the MMU 440 can compare the reception quality to a first threshold, access a list of identified cells and perform mobility measurements on only the identified cells when the reception quality exceeds the first threshold. The MMU 440 may attempt to identify additional cells and perfoxui mobility measurements on the additionally identified cells as well when the reception quality metric is below the first threshold.

The controller 450 may receive CPC parameters from the network through the RF front end 410, supply or distribute the CPC parameters to the CPC synchronizer 420, the quality metric assessor 430, and the MMU 440. For example, the controller 450 may obtain DRX parameters that determine the power-saving behavior of the mobile UE 400, a threshold or a set of thresholds, the speeds at which mobility measurements may be made, and the like. In other words, the controller 450 may assign a mobility measurement rate or a mobility measurement interval, such as the normalized activity factor 320 discussed with respect to FIG. 3.

The controller 450 can supply one or more thresholds or a functional dependency to the MMU 440 and can control the behavior of MMU 440 dynamically or in a predetermined fashion. In other words, the controller 450 may adjust the parameters of the functional dependence or may use a single functional dependence. For example, the controller 450 may supply the MMU 440 with a startup set of thresholds when the mobile UE 400 is initially powered on, and may switch to another set of thresholds thereafter.

When the quality metric is above a first threshold, the controller 450 may configure the MMU 440 to limit mobility measurements to identified cells. When the quality metric is below the first threshold, the controller 450 may configure the mobile UE 400 such that the MMU 440 searches for previously un-identified cells at either a higher frequency or for a longer duration. For example, the controller 450 may configure the MMU 440 to increase a second time interval during which the mobile UE 400 can search for new cells.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for making mobility measurements in a cellular telephone network, comprising:
   assessing a quality metric for reception of a downlink signal to a user equipment from an active cell during a plurality of discontinuous operation time periods;
   when the quality metric exceeds a threshold, performing a mobility measurement on the downlink signal only from the active cell during a first discontinuous operation time period; and
   when the quality metric is less than the threshold, performing the mobility measurement on both the downlink signal and at least another downlink signal from another cell previously un-identified during a second discontinuous operation time period that is greater than the first discontinuous operation time period but less than a DRX operation cycle.

2. The method of claim 1, wherein the downlink signal includes a data packet received during the first discontinuous operation time period.

3. The method of claim 1, further comprising:
   performing mobility measurements on the downlink signal for an identified cell during a third operation time period that is greater than the second discontinuous operation time period; and
   identifying an additional cell and performing mobility measurements on the additional cell during the third operation time period.

4. The method of claim 3, wherein the mobility measurement is performed over the third operation time period if a second threshold is greater than the quality metric.

5. The method of claim 3, wherein the third operation time period is continuous and the second discontinuous operation time period is smaller than the third operation time period.

6. The method of claim 1, wherein the cellular telephone network operates in a wideband code division multiple access (WCDMA) continuous packet connectivity (CPC) mode.

7. The method of claim 1, further comprising:
   performing mobility measurements for an adaptive measurement interval that is a function of the quality metric and a plurality of thresholds.

8. The method of claim 7, where a threshold is sent from the cellular network to the user equipment.

9. The method of claim 8, where the cellular network sends the function to the user equipment.

10. The method of claim 1, wherein performing the mobility measurements when the quality metric exceeds the threshold includes performing the mobility measurements on a currently identified cell.

11. The method of claim 1, wherein the performing the mobility measurements when the quality metric is less than the threshold includes:
    performing mobility measurements on an identified cell;
    identifying an additional cell; and
    performing a mobility measurement on a newly identified cell.

12. The method of claim 1, wherein the user equipment (UE) operates in a continuous packet connectivity (CPC) mode.

13. The method of claim 12, wherein the quality metric is measured using at least one of the third generation partnership program (3GPP) common pilot channel (CPICH) and the 3GPP synchronization channel (SCH).

14. A mobile user equipment in a cellular network, comprising:
    a transceiver configured to operate in a continuous packet connectivity (CPC) mode, receive an RF signal that includes a data packet from an active cell of the cellular network, and synchronize the mobile user equipment to a discontinuous reception (DRX) cycle;
    a quality metric assessor, coupled to the transceiver, configured to quantify a reception quality of the RF signal;
    a mobility measurement unit (MMU), coupled to the quality metric assessor, configured to selectively identify and measure the mobility of an identified cell during a mobility measurement interval; and
    a controller, coupled to the MMU, configured to adjust the mobility measurement interval based on the reception quality such that, when the reception quality exceeds a first threshold, the MMU measures only the mobility of the identified cell during a first discontinuous reception cycle and, when the reception quality is less than the threshold, the MMU identifies at least another cell previously un-identified and measures both the identified cell and the at least another cell during a second discontinuous reception cycle that is longer than the first discontinuous reception cycle but less than the DRX cycle.

15. The mobile user equipment of claim 14, wherein the MMU selectively identifies and measures the mobility of the identified cells during a mobility measurement interval based on a function of the reception quality.

16. The mobile user equipment of claim 14, wherein the MMU is further configured to perform mobility measurements only on the identified cell when the reception quality exceeds the threshold.

17. The mobile user equipment of claim 14, wherein the data packet is a voice packet.

18. The mobile user equipment of claim 14, wherein the MMU is further configured to perform mobility measurements on the identified cell during a third discontinuous reception cycle that is greater than the second discontinuous reception cycle and further configured to identify the at least another cell and perform mobility measurements on the at least another cell during the third discontinuous reception cycle.

19. The mobile user equipment of claim 14, wherein the mobile user equipment operates within a cellular wideband code division multiple access (WCDMA) network in a continuous packet connectivity (CPC) mode of operation.

20. The mobile user equipment of claim 19, wherein the reception quality is measured using at least one of the third generation partnership program (3GPP) common pilot channel (CPICH) and the 3GPP synchronization channel (SCH).

21. A cellular network, comprising:
a quality metric assessor configured to receive a demodulated data packet and measure a reception quality of a data packet signal from an active cell of the cellular network during a discontinuous reception (DRX) cycle;
a mobility measurement unit (MMU), coupled to the quality metric assessor, configured to identify only the active cell during a first discontinuous operation time period when the reception quality exceeds a threshold, identify at least another cell previously un-identified during a second discontinuous operation time period when the reception quality is less than the threshold, and measure both the active cell and the at least another cell during the second discontinuous operation time period that is greater than the first discontinuous operation time period but less than the DRX cycle; and
a controller, coupled to the MMU, configured to adjust a mobility measurement interval based on the reception quality during which the MMU identifies a cell of the cellular network.

22. The cellular network of claim 21, further comprising:
a continuous packet connectivity (CPC) synchronizer, coupled to the quality metric assessor configured to synchronize the quality metric assessor to the DRX cycle.

23. The cellular network of claim 22, wherein the data packet signal includes a voice packet.

24. The cellular network of claim 22, wherein the mobility measurement interval is at least one of a discrete function of the reception quality and a continuous function of the reception quality.

25. The cellular network of claim 24, wherein the continuous function of reception quality is at least one of piecewise linear and monotonic decreasing.

26. The cellular network of claim 24, wherein the discrete function is parameterized by a plurality of thresholds.

27. The cellular network of claim 26, wherein the mobility measurement interval decreases when the reception quality exceeds a threshold.

* * * * *